Jan. 27, 1959 S. D. WILTSE 2,871,034
PRESSURE ACTUATED RESILIENT SLEEVE TYPE TUBE COUPLING
Filed Aug. 10, 1953
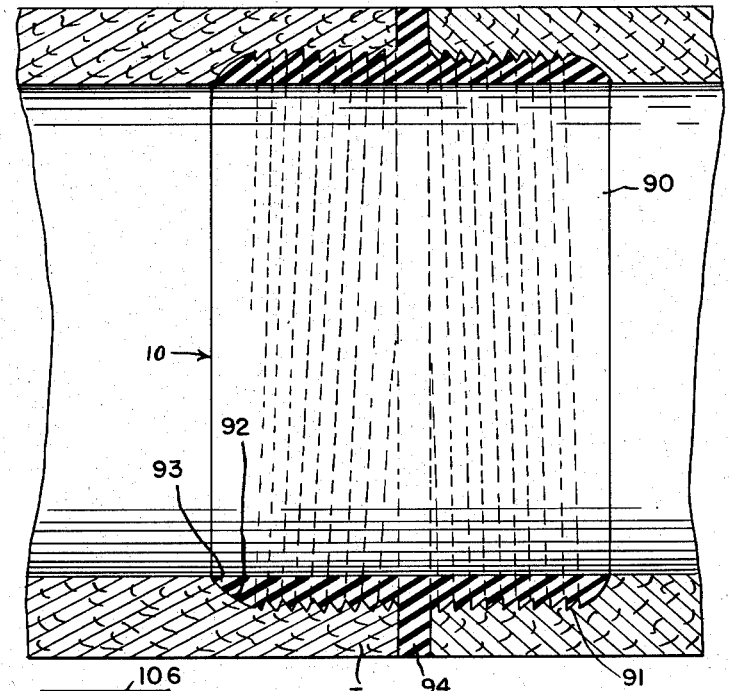
FIG.I.
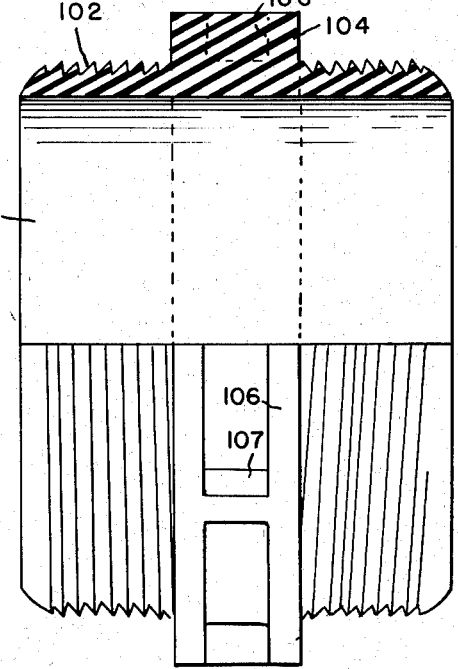
FIG. 2.
INVENTOR.
SUMNER D. WILTSE
BY
ATTORNEYS

United States Patent Office 2,871,034
Patented Jan. 27, 1959

2,871,034

PRESSURE ACTUATED RESILIENT SLEEVE TYPE TUBE COUPLING

Sumner D. Wiltse, Detroit, Mich.

Application August 10, 1953, Serial No. 373,239

1 Claim. (Cl. 285—109)

The present invention relates to a pipe or tube fitting and more particularly, a fitting designed for ready attachment to and detachment from tubes or pipes to effect coupling between pairs of pipes or to provide fittings of other types.

It is an object of the present invention to provide a tube fitting of the character described comprising a flexible resilient tubular portion adapted to be inserted within and to fit snugly against the inner surface of a tube or pipe, including pressure responsive sealing means associated therewith.

More specifically, it is an object of the present invention to provide a fitting as described in the preceding paragraph in which the inserted end of the tubular portion is of tapered wall thickness providing a highly flexible sealing lip at the end thereof.

It is a further object of the present invention to provide a tube coupling comprising a resilient flexible tubular portion, the ends of which are adapted to be inserted within the ends of tubes or pipes and to fit snugly therein.

It is a further object of the present invention to provide a tube coupling as described in the preceding paragraph in which the outer surface of the tubular portion has surface portions inclined to the axis thereof adapted to engage with similarly inclined surface portions on the tubes to provide interlock engagement.

It is a further object of the present invention to provide a tube coupling as described in the preceding paragraph in which the inclined surface portions are provided by annular ribs and grooves or by threads, and particularly by buttress threads inclined to permit insertion of the tubular portion within the tube ends but to prevent withdrawal therefrom except by unscrewing.

Other objects and features of the invention will become apparent as the description proceeds, especially when taken in conjunction with the accompanying drawings, wherein:

Fig. 1 is a fragmentary longitudinal section of one embodiment of the coupling in position to couple the ends of adjacent tubes.

Fig. 2 is a side elevation, partly in section, of a modified form of tube coupling.

Referring to Figure 1 there is illustrated an arrangement in which the coupling 10 is formed of a flexible resilient material such for example as a compound of natural or synthetic rubber, or the like. If desired for any reason, the coupling may be formed of electrically conducting rubber or rubber-like material. The tubular portion 90 of the coupling is provided on its exterior surface with buttress type threads 91, the threads at opposite ends of the tubular portion being of opposite hand. The tubes T are provided with lateral enlargements 92 also provided with buttress type threads as illustrated. The ends of the tubular portion 90 are tapered, the flexible sealing lips 93 and the inner ends of the enlargements 92 are shaped to conform exactly therewith, as illustrated in the figure. In this figure the tubular portion 90 is provided with a radially outwardly extending flange 94 constituting a gauging abutment to insure proper assembly.

The buttress threads as illustrated in this figure are particularly well adapted to permit direct assembly by simple axial movement between the tubes T and the coupling. However, due to the inclination of the buttress threads, separation between the tubes and coupling is effectively prevented.

In operation the tubular portion 90 is subjected to the internal pressure within the tube T and is pressed outwardly providing a frictional gripping of the inner surfaces of the ends of the tubes. At the same time the highly flexible lips 93 are first pressed out into sealing engagement so that escape of liquid or gas at the joint is effectively prevented.

Referring now to Figure 2 there is illustrated a tube coupling comprising a tubular body 100, the outer surfaces of the end portions being provided with buttress threads 102 of the type described in connection with Figure 1. The coupling illustrated in Figure 2 differs from that illustrated in Figure 1 in that the radially outwardly extending flange 104 is relatively wide and is provided with a non-circular outer surface for cooperation with a tool. As illustrated, the outer surface of the flange 104 has a groove 106 therein interrupted at intervals by transversely extending ribs 107. This permits gripping the coupling with a suitably formed tool and rotating the coupling relative to one or both of the coupled pipes so as to draw the pipe up into firm engagement with the side surfaces of the flange 104.

The illustrated embodiments of the present invention are responsive to internal fluid pressure in order to establish a seal and also to provide protective connection either frictionally or by abutment surfaces between the tubes and the fitting. The coupling assembly provides a resilient means of joining tubes or pipes in which the flexible lips are responsive to pressure within the tube assembly and the pressure is employed to establish and maintain the tube assembly in fluid-tight resilient connection.

If desired, bonding means may be used to provide a surface connection between the fitting and tube ends. For this purpose cold adhesives, chemical bonding, or pressure and heat may be used to obtain a bond of the required strength. When the coupling is not bonded to the tubes it will be readily apparent that the assembly can be uncoupled simply by unscrewing or withdrawing the tube ends from the coupling, or vice-versa.

It will also be obvious that the design of the coupling will be in accordance with anticipated pressures, temperatures, and materials. However, in order to illustrate the efficiency of the seal certain data is presented which relates primarily to the embodiment of the invention illustrated in Figure 1. This figure illustrates a practical coupling which has been tested. In the coupling a cement asbestos pipe of 4 inch size was employed having an internal diameter of 3.950 inches and an internal cross-sectional area of 12.177 square inches. The outside diameter of the tube was 5.200 inches and the cross-sectional area of its circular outside diameter was 21.135 square inches. A gasket was employed the tubular portion of which had an outside diameter of 4.450 inches and an inside diameter of 3.950 inches, thus providing material having a cross-sectional area of 3.288 square inches. Eight pitch buttress threads were employed having a pitch diameter of 4.375 inches to 4.367 inches. The threads were provided with ¾ inch on each end of the tubular portion of the coupling thereby providing six threads. The circumference at the bottom of the threads was 15.033 inches and the spiral length of the six threads was 90.198 inches. In another coupling one inch sections of the tubular portion were threaded providing eight threads and the spiral length of these eight threads was 120.264 inches.

The coupling was formed of a rubber, or more specifically, a synthetic rubber elastomer having a tensile strength of 2500 pounds per square inch. Thus, the tensile strength of the rubber cross-sectional area between the threaded ends of the tube portion was 8220 pounds.

The coupling was employed with 100 pounds internal pressure and with 200 pounds internal pressure. At 100 pounds internal pressure an end thrust of 1217.7 pounds was developed, whereas at an internal pressure of 200 pounds per square inch, an end thrust of 2435.4 pounds was developed. Internal radial pressure against the inside cylindrical surface of the coupling is developed. The inside diameter of the coupling was $3^{15}/_{16}$ inches and it was 3⅛ inches long, and accordingly 38.465 square inches in area was exposed to internal pressure. At 100 pounds per square inch internal pressure this developed substantially 3850 pounds radial pressure against the internal diameter of the coupling, and 7700 pounds when the internal pressure was 200 pounds per square inch Substantially all of this force appears as radial pressure against the inside of the tube end. The ratio of internal pressure against the internal diameter of the coupling to the end thrust at tube end is thus found to be 3.16 to 1, which ratio held constant independent of the internal radial pressure.

Since the coupling provided with six threads had a spiral length of approximately 90 inches, the shear at the thread root minor diameter was 13.5 pounds shear load per linear inch of thread at 100 pounds pressure, and approximately 27 pounds shear load per linear inch of thread at 200 pounds pressure. When employed with a coupling having eight threads the corresponding shear load per linear inch of thread was reduced to ten and twenty pounds respectively.

The thread depth was .083 inch, and assuming six threads with 90 inches spiral length of thread, there was a thrust area of approximately 7.5 square inches in the 90 inches of thread. Where eight threads were employed the thrust area was increased to approximately 10 square inches.

When employing adhesive or other types of bonding material the four inch pipe size provided a contact area between one tube end and the inner surface of the tube of approximately 24.39 square inches. Assuming a bond strength of 150 pounds per square inch minimum, this bond is seen to provide a strength of approximately 3659 pounds against separation. Employing a bond strength of 500 pounds per square inch, a total bond strength of 12,197 pounds is readily available, far in excess of the requirements.

While the foregoing figures were developed particularly with reference to the embodiment of the invention illustrated in Figure 1, they are indicative of results which may be obtained with other embodiments of the present invention.

In general, the material of which the fittings are made should have physical properties within the following ranges:

Hardness _____ 50 to 80 durometer reading.
Elongation _____ 200–500%.
Tensile strength_____ As required.

The drawings and the foregoing specification constitute a description of the improved tube coupling in such full, clear, concise and exact terms as to enable any person skilled in the art to practice the invention, the scope of which is indicated by the appended claim.

What I claim as my invention is:

A joint comprising a pair of tubes formed of substantially rigid unyielding material having end portions spaced apart a limited distance in axial alignment, the outer surfaces of said end portions being smooth cylindrical surfaces, the inner surface of each of said end portions being recessed adjacent the ends thereof, the inner wall of each of said recesses having a plurality of alternated equal diametered ribs and grooves formed thereon extending generally circumferentially of said tubes, said ribs having one face thereof disposed at an angle to the tube axis and sloping downwardly and inwardly from said end portion toward said axis, the end of each recess being tapered toward and merging with said inner surface, a coupling member formed of an elastometric resilient material comprising an annular abutment web interposed between the adjacent end surfaces of said tubes, integral one piece inner tubular portions extending axially in opposite directions from the radially inner edge of said web and fitted within the recessed end portions of said rigid tubes, said tubular portions having a substantially uniform average wall thickness and a length at least several times their wall thickness and an inner diameter the same as that of said tubes, the outer surfaces of said tubular portions having a plurality of alternated equal diametered grooves and ribs shaped to fit respectively into the corresponding ribs and grooves at the inner surfaces of the end portions of said tubes, the tubular portions of said coupling member having tapered ends mating with the tapered ends of said recesses and being radially expansible by yielding of the material thereof under internal fluid pressure to effect a tight grip and interlock between the said ribs and grooves to couple the tubes together, the ribs at the outer surface of said coupling member being yieldable to provide for assembly of said tubes and coupling member by direct axial relative movement into position in which the ribs of said member interfit within the grooves of said tubes, said coupling member constituting the sole means for holding said pipes and member in coupled relation.

References Cited in the file of this patent

UNITED STATES PATENTS

| | | |
|---|---|---|
| 716,413 | Schroer | May 31, 1904 |
| 813,359 | De Foreest | Feb. 20, 1906 |
| 826,678 | Marks | July 24, 1906 |
| 1,564,270 | Phillips | Dec. 8, 1925 |
| 1,876,455 | Inshaw | Sept. 6, 1932 |
| 2,103,838 | Bach | Dec. 28, 1937 |
| 2,366,067 | Smith | Dec. 26, 1944 |
| 2,366,814 | Smith | Jan. 9, 1945 |
| 2,470,359 | McLean | May 17, 1949 |
| 2,567,773 | Krupp | Sept. 11, 1951 |
| 2,644,978 | Beeker | July 14, 1953 |
| 2,702,199 | McDonnell | Feb. 15, 1955 |

FOREIGN PATENTS

| | | |
|---|---|---|
| 29,727 | Germany | Apr. 27, 1884 |
| 465,115 | Great Britain | Apr. 30, 1937 |
| 114,938 | Australia | Mar. 24, 1942 |